United States Patent
Srivastava et al.

(10) Patent No.: US 8,320,257 B2
(45) Date of Patent: Nov. 27, 2012

(54) AUTOMATIC TESTING OF SCHEDULED TELEPRESENCE MEETINGS

(75) Inventors: Aseem Srivastava, Milpitas, CA (US); John Monaghan, Clydebank (GB)

(73) Assignee: Cisco Technology, Inc., San Jose, CA (US)

( * ) Notice: Subject to any disclaimer, the term of this patent is extended or adjusted under 35 U.S.C. 154(b) by 573 days.

(21) Appl. No.: 12/049,735

(22) Filed: Mar. 17, 2008

(65) Prior Publication Data

US 2009/0231438 A1 Sep. 17, 2009

(51) Int. Cl.
*H04L 12/26* (2006.01)
*H04N 5/232* (2006.01)

(52) U.S. Cl. .................................. 370/241; 348/211.12

(58) Field of Classification Search ........................ None
See application file for complete search history.

(56) References Cited

U.S. PATENT DOCUMENTS

| | | | |
|---|---|---|---|
| 6,769,120 B1 | 7/2004 | Rodriguez | |
| 6,980,526 B2 | 12/2005 | Jang et al. | |
| 7,046,779 B2 * | 5/2006 | Hesse | 379/202.01 |
| 7,133,896 B2 * | 11/2006 | Ogdon et al. | 709/205 |
| 7,292,544 B2 * | 11/2007 | Roher et al. | 370/261 |
| 2003/0020803 A1 * | 1/2003 | Yang et al. | 348/14.01 |
| 2003/0039216 A1 * | 2/2003 | Sheldon et al. | 370/260 |
| 2005/0076238 A1 * | 4/2005 | Ormazabal et al. | 713/201 |
| 2006/0251115 A1 * | 11/2006 | Haque et al. | 370/466 |
| 2006/0256738 A1 * | 11/2006 | Kenoyer et al. | 370/260 |

* cited by examiner

*Primary Examiner* — Yong Zhou
(74) *Attorney, Agent, or Firm* — Edell, Shapiro & Finnan, LLC

(57) ABSTRACT

Equipment and network resources are automatically tested in advance of scheduled telepresence meetings in order to discover problems before the actual telepresence meeting. When a meeting between telepresence sites is scheduled, a test time is automatically scheduled for performing a test in advance of a scheduled time of the telepresence meeting. At the test time, performing the test to determine whether equipment functions at telepresence sites involved in the telepresence meeting and network resource availability are sufficient to support the telepresence meeting.

25 Claims, 6 Drawing Sheets

| SCHEDULED TELEPRESENCE MEETING INFORMATION | | | | | |
|---|---|---|---|---|---|
| DATE | TIME | PARTICIPANTS (*MEETING ORGANIZER) | PARTICIPANT PHONE NUMBERS | TELEPRESENCE SITES | SCHEDULED TEST TIME |
| 01/25/2008 | 10:00AM, EST | ADAM@MARKCO.COM*, BILL@HITCO.COM | 678-332-3341, 543-298-3244 | TS1104, TS1405 | 01/25/2008, 9:00AM, EST |
| 01/25/2008 | 2:00PM, EST | ADAM@MARKCO.COM*, STEVE@FLIPCO.COM | 678-332-3341, 735-214-5311 | TS1104, TS2405 | 01/25/2008, 1:00PM, EST |
| 01/26/2008 | 9:00AM, EST | JOHN@MARKCO.COM*, JOHN@SIMCO.COM | 678-332-5533, 345-887-3563 | TS1105, TS4403 | 01/26/2008, 8:00AM, EST |
| ⋮ | | | | | |

FIG.5

| TELEPRESENCE MEETING TEST RESULTS | | | | | |
|---|---|---|---|---|---|
| DATE | TIME | PARTICIPANTS (*MEETING ORGANIZER) | PARTICIPANT PHONE NUMBERS | TELEPRESENCE SITES | TEST RESULTS |
| 01/25/2008 | 10:00AM, EST | ADAM@MARKCO.COM*, BILL@HITCO.COM | 678-332-3341, 543-298-3244 | TS1104, TS1405 | SCHEDULED TEST RUN AND COMPLETED AT 10:07 AM, EST. TEST PASSED. NO SYSTEM FAILURES OR NETWORK AVAILABILITY ISSUE FOUND. |
| 01/25/2008 | 2:00PM, EST | ADAM@MARKCO.COM*, STEVE@FLIPCO.COM | 678-332-3341, 735-214-5311 | TS1104, TS2405 | SCHEDULED TEST RUN AND COMPLETED AT 2:09 PM, EST. NO SYSTEM FAILURES. WARNING: NETWORK AVAILABILITY IS LOW. CALL LATENCY WAS 400MS WHICH EXCEEDS THE RECOMMENDED AMOUNT OF 250MS. PARTICIPANTS MAY EXPERIENCE SLIGHT DELAYS IN VIDEO AND VOICE RECEPTION. A TROUBLE TICKET HAS BEEN RAISED WITH CASE NUMBER 36285. |
| 01/26/2008 | 9:00AM, EST | JOHN@MARKCO.COM*, JOHN@SIMCO.COM | 678-332-5533, 345-887-3563 | TS1105, TS4403 | SCHEDULED TEST RUN AND COMPLETED AT 8:10 AM, EST. WARNING: TEST FAILURE. CALL JITTER WAS 50MS WHICH EXCEEDS THE RECOMMENDED AMOUNT OF 20MS. PARTICIPANTS MAY EXPERIENCE VOICE AND VIDEO DISTORTION. A TROUBLE TICKET HAS BEEN RAISED WITH CASE NUMBER 15632. EQUIPMENT FAILURE OF CODEC FOUND FOR TS1105. NETWORK AVAILABILITY ACCEPTABLE. |
| 01/28/2008 | 1:00PM, EST | WILL@MARKCO.COM*, PAUL@HOTCO.COM | 678-332-4576, 767-887-3462 | TS1105, TS6332 | TEST INITIATED AT 1:08 PM, EST, BUT TESTING WAS NOT POSSIBLE DUE TO VIDEO CAMERA FAILURE AT TS1105. |

AUTOMATIC TESTING OF SCHEDULED TELEPRESENCE MEETINGS

FIELD OF THE INVENTION

The present disclosure relates generally to testing telepresence system equipment and network resources.

BACKGROUND

Telepresence and similar video conferencing services have specific network requirements in order to function as intended. This is primarily because they introduce so called "rich media" characteristics, such as high definition audio and video that have stringent quality of service criteria. If these criteria are not met by the network infrastructure, then the end users will experience a degraded service which is course undesirable. For example, a highly important telepresence meeting may fail to establish or may suffer audio or video distortion of some form that makes the telepresence meeting unsatisfactory to the participants.

When a problem develops with a telepresence meeting, intervention is required by the appropriate support organization, e.g., a company information technology (IT) department. Current trouble shooting techniques for telepresence systems are purely reactive, i.e., the problem during a telepresence meeting has already happened and the meeting participants are inevitably inconvenienced. A better solution would be to pre-empt any problems in advance of the telepresence meeting and thus proactively manage telepresence equipment to avoid technical problems during a scheduled telepresence meeting.

BRIEF DESCRIPTION OF THE DRAWINGS

FIG. 5 is a table that illustrates an example of information that the test component stores for scheduled telepresence meetings.

FIG. 6 is a table that illustrates an example of information that the test component generates from tests that are performed in advance of scheduled telepresence meetings.

DESCRIPTION OF EXAMPLE EMBODIMENTS

Overview

Techniques are provided herein to automatically test scheduled telepresence meetings in advance of the actual telepresence meeting taking place in order to discover any equipment failures or network resource availability issues. This greatly increases the confidence that the scheduled telepresence meeting will be successful and also allow technical support personnel time to troubleshoot problems if the test reveals problems. A telepresence system provides high quality video and audio communication between telepresence sites so as to simulate a live in person conference, but where some participants in the meeting are at a completely different location from other participants. Whereas current troubleshooting methods are purely reactive in nature, i.e., they wait until a problem occurs before troubleshooting, the techniques described herein are pro-active as they rely on scheduled event data to perform test simulation in advance of a scheduled telepresence meeting.

Accordingly, equipment and network resources are automatically tested in advance of scheduled telepresence meetings in order to discover problems before the actual telepresence meeting. When a meeting between telepresence sites is scheduled, a test time is automatically scheduled for performing a test in advance of a scheduled time of the telepresence meeting. At the test time, the test is performed to determine whether telepresence equipment functions at the telepresence site that originates the telepresence meeting and network resource availability are sufficient to support the telepresence meeting.

Figure 1:
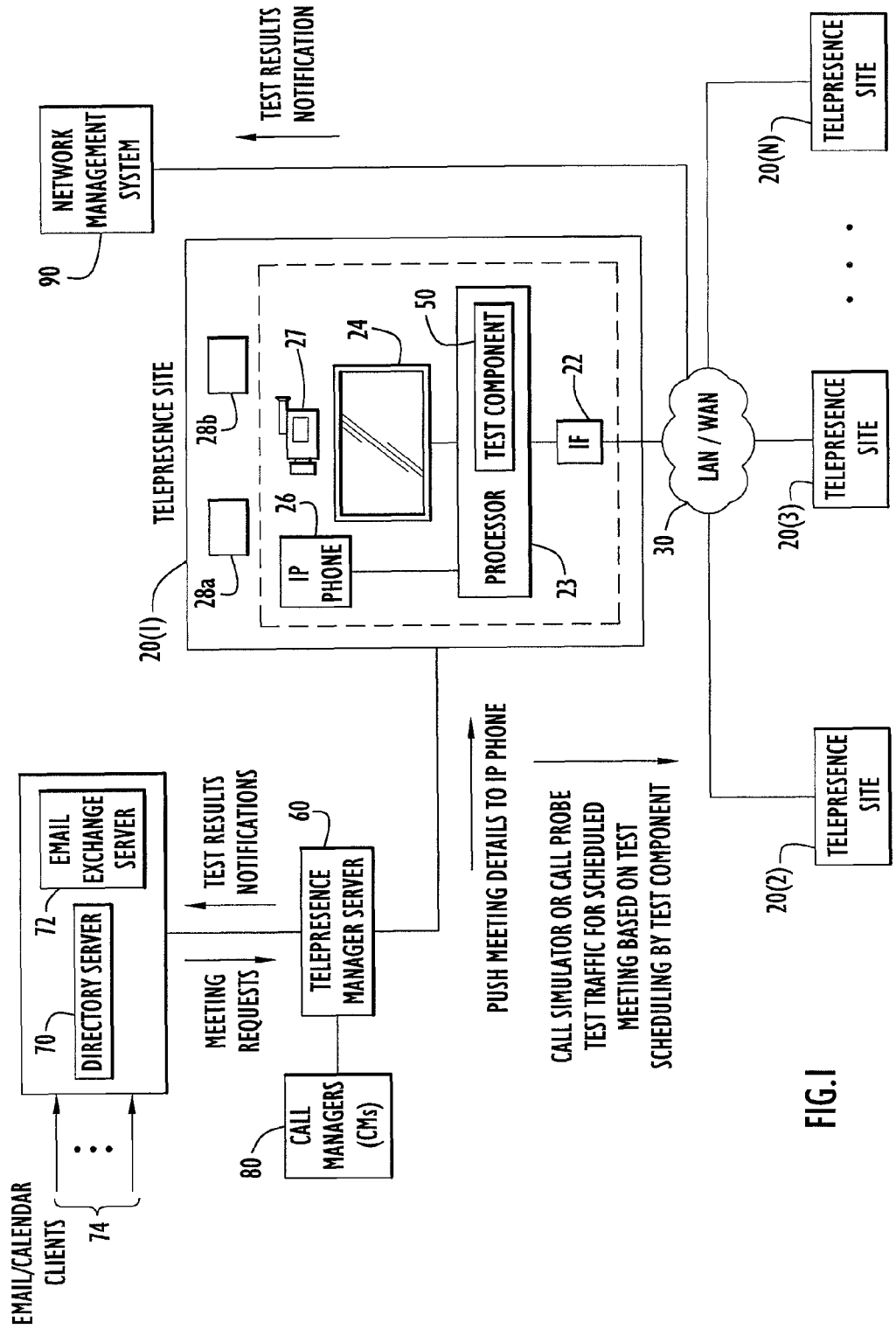
FIG. 1 is a block diagram showing an example in which telepresence equipment and network resources are tested in advance of a scheduled telepresence meeting between telepresence sites.

Referring first to FIG. 1, a communication system 10 is shown in which participants can schedule and conduct telepresence meetings between telepresence sites. For example, one telepresence site is shown at 20(1) and is located at a first location, such as in an office building. Numerous other telepresence sites are shown at 20(2), 20(3), . . . , 20(N), each of which may be located at different locations remote from the first location.

Telepresence site 20(1) comprises, for example, a network interface unit 22, a processor 23, a video display screen 24, an internet protocol (IP) phone 26, a video camera 27, and one or more participants, for example participants 28a and 28b. It should be understood that the number of video cameras in a telepresence site may vary depending on the number of participants. For example, there may be one camera for each participant, and a voice microphone associated with each participant may be detected by the voice microphone of the IP phone 26.

Telepresence sites communicate with each other by way of a local area network (LAN) and/or a wide area network (WAN), shown at 30. For example, a telepresence meeting supporting voice and audio may be established between telepresence site 20(1) and any one of the telepresence sites 20(2)-20(N). The other telepresence sites 20(2)-20(N) may comprise equipment similar to that shown in FIG. 1 for telepresence site 20(1). For example, other telepresence sites may have more displays, video cameras and IP phones in order to accommodate even more participants at a site.

The processor 23 in a telepresence site performs the voice and audio encoding with respect to outgoing audio and video, and also voice and audio decoding with respect to incoming audio and video. The processor 23 also performs various other control functions for the telepresence site. For example, the processor 23 may execute functions associated with a test component or module 50 in order to schedule and test telepresence meetings in which the telepresence site 20(1) is scheduled to participate. The test component 50 is implemented, for example, by a set of instructions stored on a computer readable medium, that, when executed by a computer, cause the computer to perform various test scheduling and test execution functions described hereinafter. Alternatively, the test component 50 may be implemented by one or more programmable or non-programmable application specific integrated circuits (ASICs) or other hardware/software modules.

There are several ways to initiate a telepresence meeting. One way to set up a telepresence meeting is to schedule a meeting in a manner similar to the way users can use a productivity software application to schedule meetings via email, etc. To this end, the system 10 comprises a telepresence manager server 60 that is connected to a directory server 70 and an email exchange server 72. The directory server 70 and email exchange server 72 serve multiple email/calendar clients (users) shown at 74. There are also one or more call manager unit(s) (CMs) shown at 80 that manages IP telephone and related communications. One example of a call manager unit is a Unified Call Manager manufactured and distributed by Cisco Systems, Inc. The telepresence manager server 60 performs many functions to integrate telepresence site operations with other business communication functions. For example, the telepresence manager server 60 "discovers" meeting rooms by interrogating the UCMs 80, "discovers" email exchange mailboxes by interrogating the directory server 70 and logs into the email exchange server 72. The telepresence manager server 60 monitors mailboxes for each telepresence site or room in a building and accepts or rejects meeting requests. To this end, the telepresence manager server 60 pushes telepresence meeting schedules to the processor 23 in a telepresence site 20(1), which in turn pushes meeting schedules to the IP phone 26. Thus, when an email client user schedules a telepresence meeting using a meeting request feature of a productivity application, the meeting data is pushed to the IP Phone(s) 26 that are present in the telepresence sites associated with the scheduled meeting, as well as appearing as a meeting on each meeting participant's calendar. The user that initiates the meeting request is referred herein as the meeting organizer. The pro-active testing techniques described herein account for the unique characteristics of telepresence, e.g., the interaction with IP Phones. That is, IP Phones are an inherent part of the telepresence system and scheduled meeting details are sent to the IP Phone 26. This scheduling message is intercepted by the test component 50 in order to schedule a test as described in more detail hereinafter.

There is a network management system (NMS) 90 that interacts with the network elements for troubleshooting and administrative purposes. One or more of the functions of the NMS 90 may be implemented by the telepresence manager server 60. Likewise, one or more of the functions of the test component 50 (described hereinafter) may be performed by the telepresence manager server 60.

Generally, the test component 50 operates to schedule tests of the telepresence site equipment and network availability associated with scheduled telepresence meetings. The tests are scheduled to be performed before (in advance of) the actual scheduled telepresence meetings. The test component 50 performs the tests by a simulated telepresence call and/or a call probe, both of which are described hereinafter, and in so doing checks the functionality and performance of telepresence site equipment including video cameras, microphones and displays at the originating telepresence site, e.g., telepresence site 20(1). After a test is performed (if a test is possible), the test component 50 generates test results and sends notifications of the test results to the NMS 90 and under some conditions also to the telepresence meeting participants.

During a test, the test component 50 transmits test traffic (test signals and test data) to the telepresence site, e.g., one of the telepresence sites 20(2)-20(N), that is to participate in the scheduled telepresence meeting. As shown in FIG. 1, when the other telepresence site receives the test signals and test data, it transmits signals back to the initiating telepresence site (e.g., telepresence site 20(1)) and the test component 50 analyzes these signals to determine whether the equipment at the telepresence site is operating properly and that there is sufficient resources (bandwidth/capacity and data rate) of the network 30 to support the scheduled telepresence meeting. In addition, the test signals and test data will test the functionality of other intermediate devices/equipment in the network between the telepresence sites. For example, the test signals and test data may test the functionality of the video camera, display, processor (encoding and decoding capabilities) and IP phone at the telepresence site on each end of the telepresence meeting. In addition, the call manager 80 responds during the initial signaling phases of a telepresence meeting test to establish the telepresence meeting. Also in some service models (e.g. business-to-business) a service provider uses devices known as session border controllers that allow locations in one business to securely communicate with locations in another. These session border controllers could also be tested during a pre-meeting test.

Figure 2:
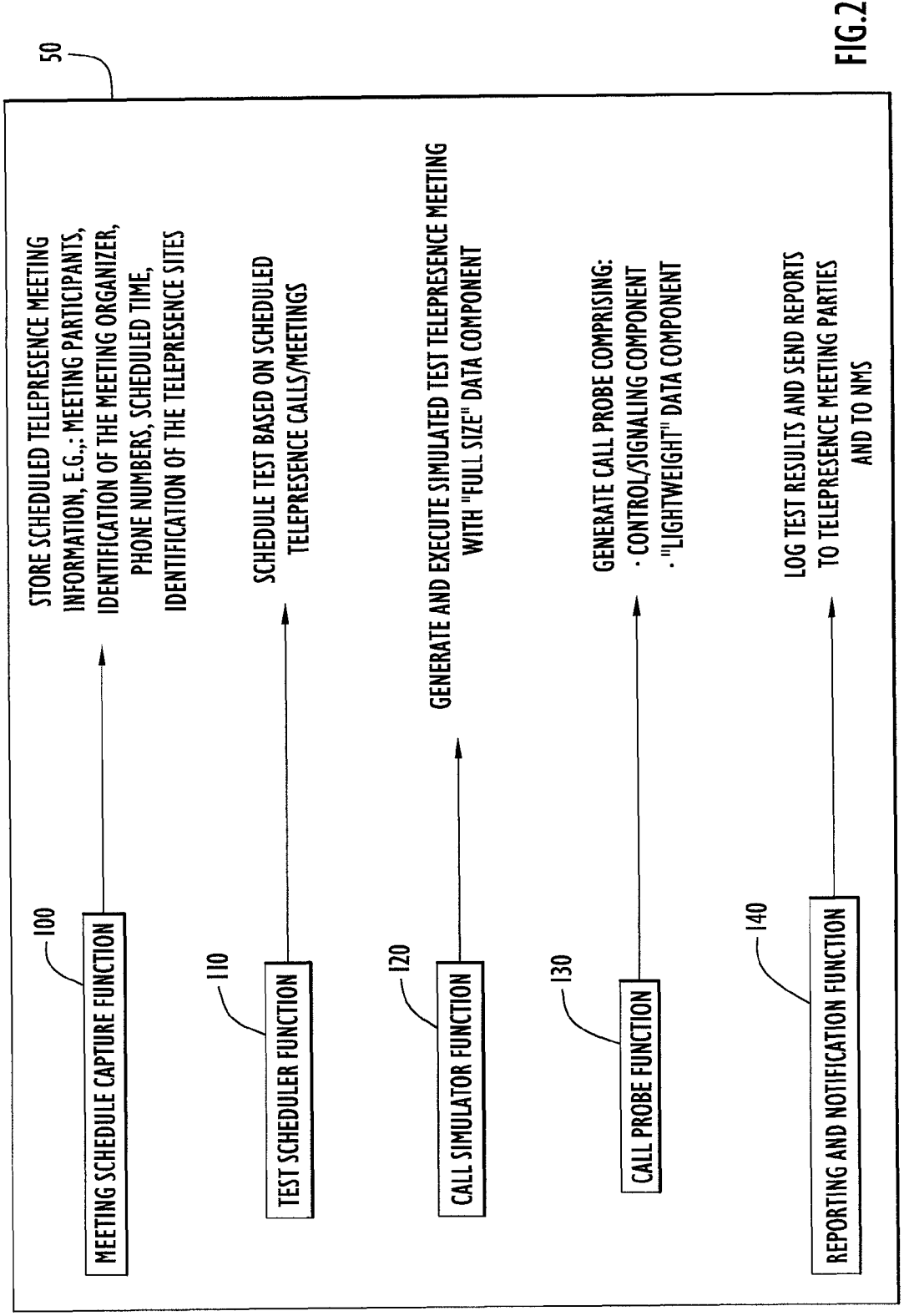
FIG. 2 is a block diagram that illustrates functions of a test component that schedules and initiates testing of a scheduled telepresence meeting.

Referring now to FIG. 2, the test component 50 is described in more detail. The test component 50 comprises a meeting schedule capture function 100, a test scheduler function 110, a call simulator function 120, a call probe function 130 and a reporting and notification function 140. The meeting schedule capture function 100 stores information pertaining to scheduled telepresence meetings (intercepted by the test component 50 from the telepresence manager server 60). Examples of the captured scheduled telepresence meeting information includes identifiers of the meeting participants (e.g., names and/or email addresses), identification of the meeting organizer (name or email address), telephone numbers of the meeting participants, scheduled time of the meeting and identification of the telepresence sites to be used in the meeting. The meeting schedule capture function 100 may capture the telepresence meeting schedule information by receiving a message resulting from a meeting organizer (one of the email/calendar clients 74 shown in FIG. 1) sending a telepresence meeting notification to one or more other meeting participants. The message that is captured may be one that is forwarded by the telepresence manager server 60 to the test component 50, or the message may be the message that the telepresence manager server 60 receives from the email exchange server 72 (in the case where the functions of the test component are performed by the telepresence manager server 60).

The test scheduler function 110 stores data for a scheduled test time for performing a test of the telepresence sites and network availability before (in advance of) the actual scheduled telepresence meeting. In one example, tests are scheduled to be performed one hour in advance of the scheduled telepresence meeting. However, the amount of time before the scheduled meeting that a test is performed may be user-programmable by the meeting organizer, a network administrator, etc. A default time interval, e.g., one hour before the scheduled meeting time, may be used if a particular time interval is not otherwise programmed or selected.

When telepresence sites are engaged in a telepresence meeting, the equipment at each telepresence site generates and transmits encoded audio and video data to the other telepresence site. There is a signaling or control component and a data component associated with the audio and video data that each telepresence site generates and transmits to another telepresence site during a telepresence meeting.

To this end, the call simulator function 120 generates and executes a simulated telepresence meeting test traffic between the telepresence sites involved in the meeting. In particular, the call simulator function 120 generates and transmits signals and data to simulate a telepresence meeting between the telepresence sites involved in the scheduled telepresence meeting, and monitors signals received from the other telepresence site involved in the meeting. This function may be one that is integrated into the standard functionality of a telepresence site processor (e.g., processor 23 of the telepresence site 20(1) shown in FIG. 1). The data generated by the call simulator function 120 closely mimics that used in an actual telepresence meeting. There are both data and control plane components and the generated data is of a similar size and rate to an actual telepresence meeting. For example, the call simulator function 120 may be configured to send 16 MB of high definition video content with "bursty" traffic. When the simulated telepresence meeting is performed, the call simulator function 120 will determine whether the equipment (e.g., processor 23, display 24, IP phone 26, and camera 27) at the telepresence site 20(1) that originates a telepresence meeting (the telepresence site selected by the meeting organizer when the meeting was scheduled) and the interfaces and queues in the network infrastructure equipment which are used when connecting with other telepresence sites are operating properly. The call simulator function 120 can also determine whether the equipment and network resources are capable of supporting the full resolution of digital video and/or audio, and whether a reduced quality level of service may be necessary due to equipment or network resource limitations. Moreover, the call simulator function can measure latency and jitter between the telepresence sites to be sure that these parameters fall within or below acceptable levels. Thus, to summarize, the call simulator function 120 generates and transmits (from one of the telepresence sites, e.g., telepresence site 20(1), to another telepresence site, e.g., telepresence site 20(2), involved in the scheduled meeting) simulated telepresence meeting test traffic signals and data that have a traffic volume comparable to that for signals and data associated with an actual telepresence meeting between the telepresence sites.

The call probe function 130, on the other hand, generates a call test traffic that comprises signals (signaling component) and data (data component) representing audio and video traffic, but which have much smaller volume than (not comparable to that of) an actual or simulated telepresence call established by the call simulator function 120. The call probe function 130 generates the signaling component and data component traffic with specific features that make the call probe different from traditional probes, such as Internet Protocol (IP) Service Level Agreement (SLA) probe techniques developed and sold by Cisco Systems, Inc. For example, the signaling component triggers responses by telepresence equipment and the test component can monitor those responses in order to report any failures in the signaling phase of a telepresence site connection. Therefore, the call probe test traffic consumes less network resources because it generates a different traffic profile that the call simulator function 120. The term "traffic profile" for a telepresence test function or an actual telepresence meeting includes characteristics such as bandwidth, individual packet sizes and degree of bursts of the traffic (so-called "burstiness"). Consequently, the call probe can be run while a telepresence meeting is in progress, and generally at any time (periodically or on demand). However, the call probe would not provide as accurate a test because, for example, the interfaces and queues managed by the infrastructure equipment (e.g., switches and routers) in the network 30 would not be subject to the same level of traffic as that associated with a simulated telepresence call generated by the call simulator function 120. Like the call simulator function 120, the call probe function 130 receives signals back from the equipment in the network 30, equipment at the other telepresence site involved in the scheduled meeting and other intermediate equipment involved in the signaling function (during set up of the telepresence meeting test) to determine whether those equipment are functioning properly. To summarize, the call probe function 130 generates and transmits (from one of the telepresence sites, e.g., site 20(1) to another telepresence site, e.g. 20(2), involved in the scheduled meeting) a test traffic that comprises a signaling component and a data component that are suitable for testing equipment at the telepresence sites and the network resources, but which have a traffic volume that is much smaller than that for an actual telepresence meeting. Thus, the call simulator function 120 and the call probe function 130 test the same functions and can generate the same type of test result data, but tests performed with the call simulator function 120 are more accurate than the tests performed using the call probe function 130. The call simulator function 120 also receives signals back from the other telepresence site and intermediate equipment during the setup/signaling phase of the test, and during the media phase of the test data is analyzed to measure network performance parameters such as data rate, bandwidth, jitter and latency.

Whether using the call simulator function 120 or the call probe function 130, the originating telepresence site (e.g., site 20(1)) initiates the test component 50 and signals the other telepresence site with an invite message. This invite message is similar to a session initiation protocol (SIP) invite but has an indication, such as a flag, that indicates that the session is for a test. The other telepresence site receives the invite message either directly or indirectly from other equipment such as CMs 80 and recognizes the test component 50 as the source of the invite message and generates a response to establish a connection between the telepresence sites. After the initial SIP signaling between the telepresence sites is complete, the media cut through begins during which test traffic is transmitted from the originating telepresence site to the other telepresence site. This is similar to the communication of traffic during an actual telepresence meeting and as this traffic is delivered, the test component 50 generates and/or collects statistics such as those listed above. Thus, the test component 50 tests from telepresence site 20(1) to another telepresence site but the test component 50 may receive responses from intermediate devices as well as the other telepresence site that is to participate in the meeting.

The reporting and notification function 140 stores (logs) test results from the tests performed by the call simulator function 120 and/or the call probe function 130. In addition, the reporting and notification function 140 sends reports to the telepresence meeting participants and to the NMS 90.

Figure 3:
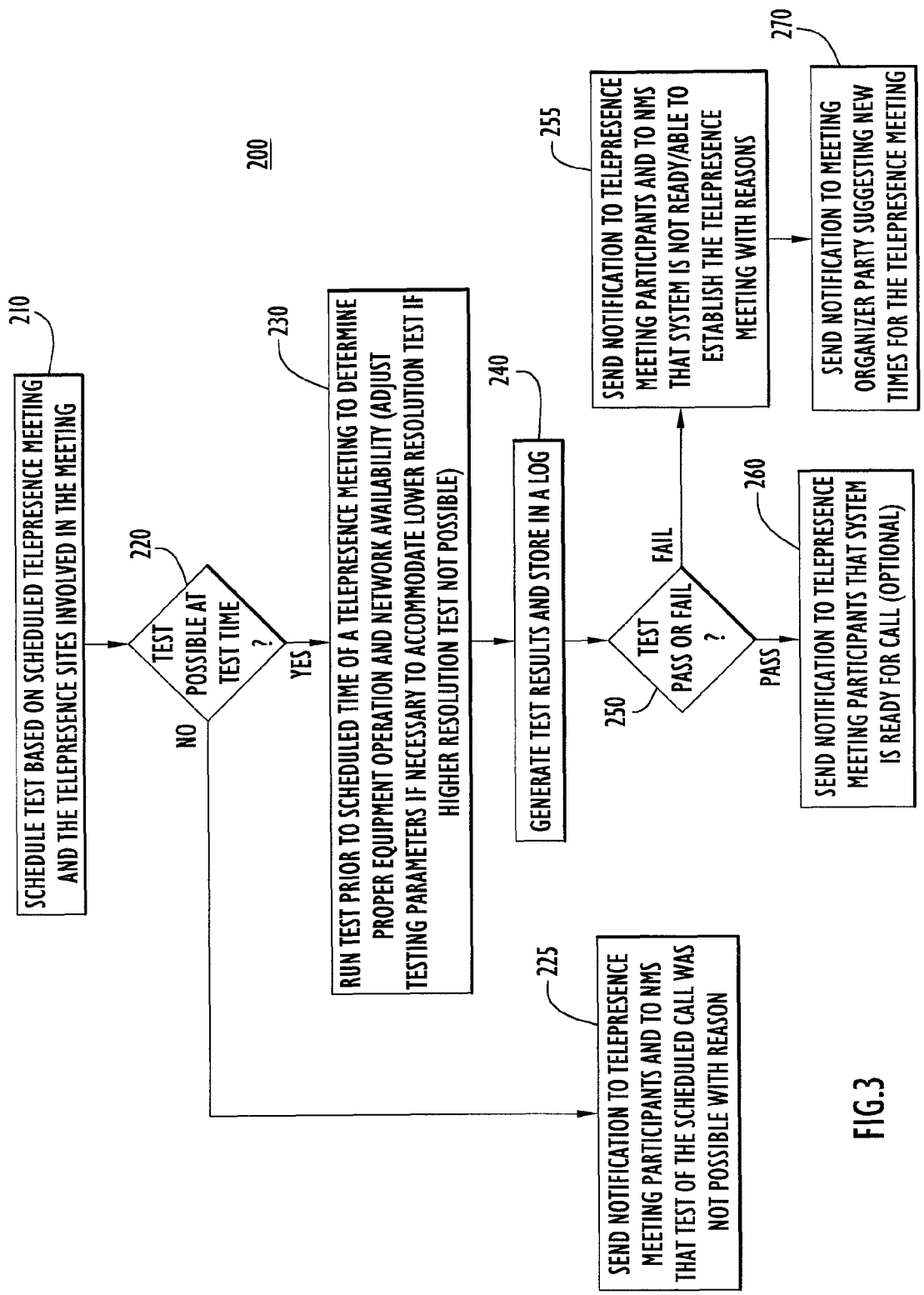
FIG. 3 is a flow chart that generally illustrates an example of how the test component schedules tests, executes tests and reports test results for a scheduled telepresence meeting.

Turning now to FIG. 3, a high level flow diagram 200 depicting an example of the automatic scheduled testing of telepresence calls is described with reference to FIGS. 1 and 2. At 210, the test component 50 intercepts meeting requests from telepresence manager server 60 when a meeting organizer user sends out a meeting request that designates a telepresence meeting involving telepresence site 20(1). The test component 50 schedules a test based on the scheduled telepresence meeting and stores data representing the test time for testing the telepresence sites and network in advance of the scheduled telepresence meeting. As explained above, the scheduled test time may be set to a default time (e.g., one hour) prior to the actual telepresence meeting, but that time can be overridden by the network administrator and/or the meeting organizer.

At 220, when the test time arrives, the test component 50 determines whether a test is possible. For example, a test may not be possible due to some major failure of equipment at the telepresence site 20(1) and/or at the other telepresence site (e.g., telepresence site 20(2)) which is to be involved in the scheduled telepresence meeting. If it is determined at 220 that a test cannot be performed, then at 225 the test component sends a notification to the telepresence meeting participants (and optionally to the NMS 90) indicating that the test of the scheduled call was not possible, together with a short statement of the reason for the inability to perform the test.

If at 220, the test component 50 determines that the test can be performed, then at 230, the test component runs the test at the scheduled test time to determine whether equipment at the telepresence sites is operating properly and network availability is sufficient to support the scheduled telepresence meeting. The test may be performed with either the call simulator function 120 and/or the call probe function 130. The decision of which of these test functions to use is described in more detail hereinafter in conjunction with FIG. 4. If network resources (bandwidth) available at the time of the test is such that the full (video and/or audio) resolution needed for the scheduled telepresence meeting cannot be tested, then the test component may adjust parameters of the call simulator function 120 or call probe function 130 in order to test at a lower resolution if a higher resolution test is not possible. The profile or parameters of the test, e.g. resolution of the video, may vary. In one example, they are set to match those expected to be used during the scheduled telepresence meeting.

That is, at 230, the test is performed with initial test parameters that are based on expected or known performance criteria for the scheduled telepresence meeting. For example, when scheduling the telepresence meeting the user may indicate that a certain quality or resolution of video and/or audio is needed. Thus, the performance criteria would be known in this case. Thus, the test is performed with initial test parameters that are based on the known performance criteria. If no performance criteria are provided, the text component may deduce the expected performance criteria based on the particular telepresence sites involved in the scheduled meeting, the individuals involved in the meeting, etc. In the latter case, the test component will perform the test with initial test parameters based on the expected performance criteria. If it is determined after attempting to conduct a test with the initial test parameters that the test cannot be support a meeting with the initial test parameters due to equipment or network resource issues, then the test component may adjust the test parameters (i.e., to a lower level) and conduct the test with the adjusted test parameters.

At 240, after the test is performed the reporting and notification function 140 generates test result data and stores the test results in a log or database.

At 250, the test component 50 determines whether the test passed or failed. If the test passed, then at 260 the reporting and notification function 140 sends a notification to the meeting participants that the system is fully functional for the telepresence meeting. However, it may also be desirable that when a scheduled test is performed and is found to pass, the test component may not send any notification to the meeting participants on the assumption that "no news is good news."

At 255, if the test fails, then the reporting and notification function 140 sends a notification to the telepresence meeting participants and optionally to the NMS 90 indicating that the system is not ready/able establish the telepresence meeting together with a short statement for the reason why the test failed. For example, the reporting and notification function 140 may send a notification to at least one participant of the telepresence meeting when results of the test indicates that the telepresence meeting cannot be conducted or when audio and/or video quality may be severely degraded. At 270, the reporting and notification function 140 may also send a notification to the meeting organizer suggesting new times for the telepresence meeting in the event that it can be determined when the equipment and/or network failure can be fixed.

Figure 4:
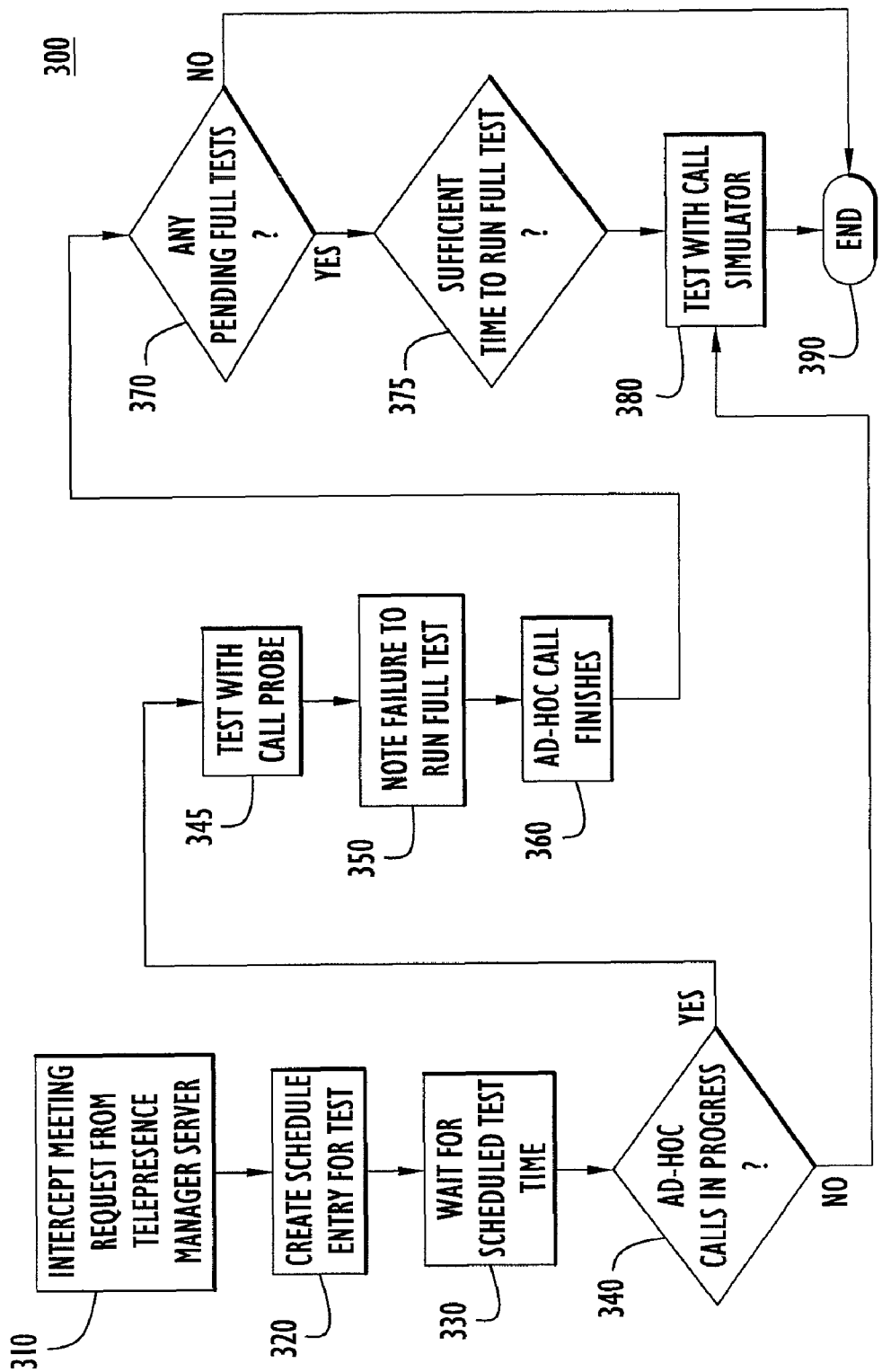
FIG. 4 is a flow chart that illustrates a more detailed example for scheduling and performing tests of a scheduled telepresence meeting.

Turning to FIG. 4, a more detailed flow chart diagram 300 is provided to illustrate one example of how the test component performs the scheduled tests. Reference is also made to FIGS. 5 and 6 in conjunction with the description of FIG. 4. As explained above, when a meeting organizer schedules a telepresence meeting, the test component 50 intercepts the meeting request from the telepresence manager server 60 at 310 and at 320 schedules an entry for the test. For example, as shown in FIG. 5, entry 410 is created when a meeting organizer, adam@markco.com, sends a meeting request to meeting participants in order to schedule a telepresence meeting on Jan. 25, 2008 at 10:00 AM, EST. The test component 50 stores an entry for that telepresence meeting, together with identifiers (email addresses) of all of the meeting participants, the telephone numbers of the meeting participants and identifiers of the telepresence sites involved in the telepresence meeting (e.g., TS1104 and TS1405). In addition, the test component 50 stores an indication of the scheduled test time for that telepresence meeting. For example, a scheduled test time of 9:00 AM is stored for entry 410, which is one hour before the scheduled telepresence meeting at 10:00 AM. Entry examples 420 and 430 are shown for other telepresence meetings, and their scheduled test times.

At 330, the test component 50 waits for the scheduled test time. When a test is due to be performed, the test component 50 extracts the relevant information of the scheduled meeting from the stored data (e.g., data of FIG. 5) such as the phone numbers of the participants, the meeting organizer and other telepresence site involved in the meeting (end point contacts).

At the time of the scheduled test, at 340 the test component 50 checks telepresence sites involved in the scheduled meeting to determine whether a ad-hoc telepresence meeting is currently taking place at any of the telepresence sites involved in the scheduled meeting. If it is determined that there is ongoing telepresence meeting activity, then at 345 the test component 50 uses the call probe function to test the network and telepresence site equipment. The call probe test traffic places a lower overhead on the network resources and therefore it is possible to perform a call probe test while an actual telepresence meeting is occurring. After a test is initially set up, the test component 50 analyzes signals to make measurements in order to determine performance and other related statistics described above. Once the test is run, a message is sent to the NMS containing the test results. Also, at 350, the fact that a full test (call simulator) was not possible and that the call probe test was run is recorded in a "pending full test" list.

At 360, the test component 50 determines when the ad-hoc telepresence meeting terminates (is completed) by receiving a notification from an IP phone at the telepresence site 20(1) and at 370 the test component determines whether there are any pending full (call simulator) tests to be performed. If there is at least one pending full test to be performed, then at 375 the test component determines whether there is sufficient time available to perform them. That is, the test component 50 determines if the remaining time before the scheduled telepresence meeting to be fully tested is greater then a minimum time interval, and if so the full test is attempted again using the call simulator at 380. For example, this minimum time interval may have a default value of 15 minutes, but it can be overridden by a network administrator. If there is not sufficient time remaining before the scheduled telepresence meeting, then the test component 50 does not run the full call simulator test and the process ends at 390.

At 340, when the test component 50 determines that there are no ad-hoc calls in progress, then the test component 50 invokes the call simulator function 120 at 380 to generate and transmit simulated telepresence meeting test traffic in order to test the telepresence site equipment and network resources. The test component 50 updates the IP Phone 26 at the telepresence site 20(1) to indicate that a simulated call is in progress. This simulated telepresence meeting test can be terminated by a user via the IP Phone 26 if an ad-hoc telepresence meeting is required using that telepresence site.

The call simulator function 120 and the call probe function 130 of the test component 50 mark the signals differently from normal call signals. This allows management applications to identify and interpret test data independently, and also allows billing systems to ignore them if required.

FIG. 6 illustrates an example of a log of data associated with telepresence test scenarios. Results from tests performed in advance of several scheduled telepresence meetings are shown in the column labeled "Test Results". Entry 510 corresponds to entry 410 shown in FIG. 5 for the telepresence meeting scheduled by adam@markco.com at 10:00 AM, EST on Jan. 25, 2008. The test for this telepresence meeting was run and completed at 10:07 AM EST on Jan. 25, 2008. A full call simulator test was run and it passed as no equipment failures or network availability issues were found.

The entry at 520 in FIG. 6 corresponds to the entry 420 in FIG. 5 for the telepresence meeting scheduled by ad adam@markco.com at 2:00 PM, EST on Jan. 25, 2008. In this case, the scheduled full call simulator test was run and completed at 2:09 PM, EST. No system failures were found but network resource availability was found to be low. Moreover, the test component determined that call latency was 400 ms, exceeding a recommended latency of 250 ms. As a result, participants may experience slight delays in video and voice reception. In this case, the test component may generate a notification message informing the participants of the latency issue. In addition, the test component may generate a network "trouble ticket" that is sent to the NMS in order to have a network administrator investigate the latency issue and fix it.

The entry 530 in FIG. 6 corresponds to the entry 420 in FIG. 5 for the telepresence meeting scheduled by john@markco.com at 9:00 AM, EST on Jan. 26, 2008. In this case, the scheduled test was run and completed at 8:10 AM, EST, and a warning notification is generated because the full call simulator test failed. In addition, the test component determined that the call jitter was 50 ms, a value that exceeds the recommended jitter of 20 ms. As a result, participants may experience voice and video distortion. The test component may open a trouble ticket that is sent to the NMS. In addition, the test component determined that there was an equipment failure for the codec function at telepresence site TS1105 that is to be participating in the scheduled telepresence meeting. The test component also determined that the network resource availability was acceptable for that meeting.

Entry 540 shows still another example of a telepresence meeting scheduled for 1:00 PM, EST on Jan. 28, 2008, by meeting organizer will@markco.com. In this case, the test was initiated at 1:08 PM, EST, but it could not be performed due to camera failure at telepresence site TS1105. When there is a failure to run a test, the test notification and reporting function of the test component may generate a message that is sent to the NMS, e.g., "Test of scheduled call between MarkCo and Hotco organized William Stephens (at Markco) at 1 PM, EST not possible due to video camera failure at telepresence site TS1105." When some of the network management functionality is implemented in the telepresence server manager 60, the telepresence server manager 60 may provide notification to the meeting organizer and participants of the problems detected from a scheduled test as well as proposed resolutions to those problems, together with a suggestion for new times to have the telepresence meeting.

While not specifically indicated in FIG. 6, the stored test results for a scheduled test may also indicate whether the test performed was a full call simulator test or a call probe test.

As explained above in conjunction with FIG. 3, test progress and results (successful or otherwise) may be published in several formats. In one example, the test component 50 is tightly integrated with the operating system of the processor 23 of a telepresence site 20(1). As a result, telepresence meeting data and records are created as per an actual telepresence meeting. This means that, for example, the log files generated by the processor 23 are populated with the test results and the details of the test results may be made available on a web-based graphical user interface (GUI) to the processor 23 and in the small network simple network management protocol (SNMP) call management information base (MIBs).

The concepts described herein may be embodied in other specific forms without departing from the spirit or essential characteristics thereof. The foregoing embodiments are therefore to be considered in all respects illustrative and not meant to be limiting.

What is claimed is:
1. A method comprising:
capturing scheduling information for a scheduled telepresence meeting initiated by a meeting organizer, the scheduling information including information identifying the meeting organizer, members of meeting participants, and a plurality of telepresence sites to be used during the scheduled telepresence meeting;
scheduling a test time in a default time interval for a test of equipment and network resources that will be used for the scheduled telepresence meeting based on the scheduling information, wherein the test time is before a scheduled time for the scheduled telepresence meeting;
performing the test at the test time by generating and transmitting, from a first one of the plurality of telepresence sites to a second one of the telepresence sites involved in the scheduled telepresence meeting, probe test traffic that comprises signals and data representing audio and video traffic that are suitable for testing (i) audio, video and display functionalities of telepresence equipment at the second telepresence site, (ii) encoding and decoding capabilities of the telepresence equipment at the second telepresence site and (iii) the network resources that will be used for the scheduled telepresence meeting;
evaluating availability of the network resources to be used for the scheduled telepresence meeting based on results of the test;
determining whether the telepresence equipment at the second telepresence site functionality and network resources are operating sufficiently to support the scheduled telepresence meeting based on the results of the test;
determining whether there is ongoing telepresence meeting activity that is using the telepresence sites for a telepresence meeting other than the scheduled telepresence meeting;
determining whether there are any pending tests to be performed on the telepresence equipment at remaining ones of the plurality of telepresence sites;
determining whether there is sufficient time available to perform the pending tests; and performing the pending tests on the telepresence equipment at the remaining ones of the plurality of telepresence sites when there is sufficient time available to perform the tests.

2. The method of claim 1, wherein performing the test at the test time comprises generating and transmitting the signals and data of the probe test traffic that have a size, data rate and traffic volume comparable to that for signals and data associated with an actual telepresence meeting between the telepresence sites.

3. The method of claim 1, wherein performing the test at the test time comprises generating and transmitting the signals and data of the probe test traffic that have a size, data rate and traffic volume that is smaller than that for an actual telepresence meeting.

4. The method of claim 3, wherein generating and transmitting comprises generating and transmitting the signals and data of the probe test traffic when there is an ongoing telepresence meeting between telepresence sites that are involved in the scheduled telepresence meeting.

5. The method of claim 1, wherein performing the test at the test time comprises simulating a telepresence meeting, after completion of the test, with simulated telepresence meeting test traffic when it is determined that there is sufficient time remaining before the scheduled time of the scheduled telepresence meeting.

6. The method of claim 1, and further comprising receiving a notification that the ongoing telepresence meeting activity other than the scheduled telepresence meeting has terminated.

7. The method of claim 1, and further comprising generating test result data from performing the test, wherein the test result data indicates an actual test time that the test was performed and whether there was any failure of telepresence equipment and network resource availability issues that would degrade quality of voice, data or video during the telepresence meeting.

8. The method of claim 7, and further comprising sending a notification to a network management entity, wherein the notification contains information describing the results of the test and reasons for failure of the test when the results of the test indicate that the test failed.

9. The method of claim 1, and further comprising sending a notification to at least one participant of the telepresence meeting that indicates that the scheduled telepresence meeting cannot be conducted when the results of the test indicate that the scheduled telepresence meeting cannot be conducted or when audio or video quality may be severely degraded.

10. The method of claim 1, wherein capturing comprises receiving a message resulting from the meeting organizer and sending a telepresence meeting notification to one or more meeting participants.

11. The method of claim 1, wherein performing the test at the test time comprises performing the test with initial test parameters that are based on expected or known performance criteria for the scheduled telepresence meeting.

12. The method of claim 11, and further comprising adjusting test parameters when it is determined that telepresence equipment and network resources cannot support the scheduled telepresence meeting at the initial test parameters.

13. The method of claim 1, wherein performing the test at the test time comprises:
sending a test signal from the first telepresence site to the second telepresence site to test the functionality of telepresence equipment at the second telepresence site and to test the functionality of telepresence equipment at any intervening telepresence site between the first telepresence site and the second telepresence site;
receiving, at the first telepresence site, a response signal from the second telepresence site sent in response to the test signal; and
analyzing the response signal at the first telepresence site to determine whether the telepresence equipment at the second telepresence site and at the intervening telepresence site are operating sufficiently.

14. The method of claim 1, wherein performing the test at the test time comprises performing the test to determine whether the telepresence equipment at the second telepresence site and the interfaces and queues in network infrastructure equipment are operating sufficiently to support the telepresence meeting.

15. The method of claim 1, wherein performing the test at the test time comprises performing the test to determine functionality and performance of the telepresence equipment including video cameras, microphones and displays at a telepresence site.

16. The method of claim 1, wherein performing the test at the test time comprises performing the test to evaluate availability of the network resources according to data rate, bandwidth, jitter and latency parameters.

17. The method of claim 1, and further comprising:
storing results from the test of the equipment and network resources in a database; and
sending a notification to one or more participants of the scheduled telepresence meeting that the scheduled telepresence meeting cannot be conducted when the results of the test indicate that the scheduled telepresence meeting cannot be conducted.

18. A non-transitory computer readable storage medium storing instructions that, when executed by a computer, cause the computer to:
capture scheduling information for a scheduled telepresence meeting initiated by a meeting organizer, the scheduling information including information identifying the meeting organizer, members of the meeting participants, and a plurality of telepresence sites to be used during the scheduled telepresence meeting;
schedule a test time in a default time interval for a test of equipment and network resources that will be used for the scheduled telepresence meeting based on the scheduling information, wherein the test time is before a schedule scheduled time for the telepresence meeting;
perform the test at the test time by generating and transmitting, from a first one of a plurality of telepresence sites to a second one of the telepresence sites involved in the scheduled telepresence meeting, probe test traffic that comprises signals and data representing audio and video traffic that are suitable for testing (i) audio, video and display functionalities of telepresence equipment at the second telepresence site, (ii) encoding and decoding capabilities of the telepresence equipment at the second telepresence site and (iii) the network resources that will be used for the telepresence meeting;
evaluate availability of the network resources to be used for the telepresence meeting based on results of the test;
determine whether the telepresence equipment at the second telepresence site and the network resources are operating sufficiently to support the telepresence meeting based on the results of the test;
determine whether there is ongoing telepresence meeting activity that is using the telepresence sites for a telepresence meeting other than the scheduled telepresence meeting;

determine whether there are any pending tests to be performed on the telepresence equipment at remaining ones of the plurality of telepresence sites;

determine whether there is sufficient time available to perform the pending tests; and perform the pending tests on the telepresence equipment at the remaining ones of the plurality of telepresence sites when there is sufficient time available to perform the tests.

19. The non-transitory computer readable storage medium of claim 18, and further comprising instructions that, when executed by the computer, cause the computer to generate test result data from performing the test, wherein the test result data indicates an actual test time that the test was performed and whether there was any failure of telepresence equipment functions and network resource availability issues that would degrade quality of voice, data or video during the telepresence meeting.

20. The non-transitory computer readable storage medium of claim 19, and further comprising instructions that, when executed by the computer, cause the computer to send a notification to a network management entity, wherein the notification contains information describing the results of the test and reasons for failure of the test when the results of the test indicate that the test failed.

21. The non-transitory computer readable storage medium of claim 18, and further comprising instructions that, when executed by the computer, cause the computer to:

store results from the test of network equipment and the network resources in a database; and send a notification to one or more participants of the scheduled telepresence meeting that the scheduled telepresence meeting cannot be conducted when results of the test indicate that the scheduled telepresence meeting cannot be conducted.

22. The non-transitory computer readable storage medium of claim 18, wherein the instructions that cause the computer to perform the test at the test time comprise instructions that cause the processor to generate and transmit the signals and data of the probe test traffic that have a size, data rate and traffic volume comparable to that for signals and data associated with an actual telepresence meeting between the telepresence sites.

23. The non-transitory computer readable storage medium of claim 18, wherein the instructions that cause the computer to perform the test at the test time comprise instructions that cause the computer to generate and transmit the signals and data of the probe test traffic that have a size, data rate and traffic volume that is smaller than that for an actual telepresence meeting.

24. The non-transitory computer readable storage medium of claim 18, wherein the instructions that cause the computer to perform the test at the test time comprise instructions that cause the computer to perform the test to determine functionality and performance of the telepresence equipment including video cameras, microphones and displays at a telepresence site.

25. The non-transitory computer readable storage medium of claim 18, wherein the instructions that cause the computer to perform the test at the test time comprise instructions that cause the computer to perform the test to evaluate availability of the network resources according to data rate, bandwidth, jitter and latency parameters.

* * * * *